United States Patent [19]

Mosele

[11] Patent Number: 4,686,603

[45] Date of Patent: Aug. 11, 1987

[54] OVERVOLTAGE ARRESTER

[75] Inventor: Joseph Mosele, Biberist, Switzerland

[73] Assignee: BBC Brown, Boveri & Company, Limited, Baden, Switzerland

[21] Appl. No.: 817,445

[22] Filed: Jan. 9, 1986

[30] Foreign Application Priority Data

Feb. 26, 1985 [CH] Switzerland ........................ 862/85

[51] Int. Cl.⁴ ........................................ H02H 9/04

[52] U.S. Cl. ................................ 361/118; 361/127; 361/128; 361/130

[58] Field of Search ............. 361/117, 111, 118, 119, 361/120, 121, 126, 127, 129, 130; 315/36; 313/231.11, 325

[56] References Cited

U.S. PATENT DOCUMENTS

| | | | |
|---|---|---|---|
| 3,914,657 | 10/1975 | Melanson | 361/117 |
| 4,092,694 | 5/1978 | Stetson | 361/127 X |
| 4,100,588 | 7/1978 | Kresge | 315/36 X |
| 4,223,366 | 9/1980 | Sweetana et al. | 315/36 X |
| 4,240,124 | 12/1980 | Westrom | 361/127 |
| 4,385,338 | 5/1983 | Hasse et al. | 361/130 |
| 4,463,405 | 7/1984 | Koch et al. | 361/127 X |
| 4,476,513 | 10/1984 | Stenström | 361/127 |

*Primary Examiner*—A. D. Pellinen
*Assistant Examiner*—Derek S. Jennings
*Attorney, Agent, or Firm*—Burns, Doane, Swecker & Mathis

[57] ABSTRACT

An overvoltage arrester having power connectors at its opposite ends is provided with an insulating housing that encloses a stack of coaxially arranged cylindrical varistors at least partially embedded in insulating material. An annular space is provided between the insulating material and the interior wall of the housing and is filled with an electrically insulating, heat-conducting material. The housing is protected from bursting in the event of the occurrence of an electrical flash-over along the varistor stack by a pressure relief duct that extends along the varistors between the power connections.

14 Claims, 2 Drawing Figures

OVERVOLTAGE ARRESTER

BACKGROUND OF THE INVENTION

Known overvoltage arresters are constructed of a stack of cylindrical varistors which are arranged coaxially with respect to each other in a housing of insulating material. The individual varistors are surrounded by mutually overlapping protective elements between which and the partition wall of the housing of insulating material an annular space has been left. Although ionized gases produced, for example, by glow discharges between adjacent varistors cannot enter the annular space between the protective elements and the housing of insulating material in this overvoltage arrester, an arc can form in this space in the case of a disturbance, which arc subjects the housing of insulating material to considerable mechanical and thermal stress.

From U.S. Pat. No. 4,100,588 an overvoltage arrester is also known which comprises a stack of varistors located in a housing of insulating material, between which stack and the inside wall of the housing of insulating material bodies of silicone rubber insulating material with a filling of aluminum oxide powder are arranged. Although heat generated in the varistors is removed to the outside via the bodies of insulating material during operation of this overvoltage arrester, an arc formed in the case of a disturbance will, nevertheless, subject the housing of insulating material to considerable stress even in this overvoltage arrester.

In the case of an overvoltage arrester described in German Auslegeschrift No. 1 28 01 666 and comprising a varistor stack located inside a housing of insulating material, an annular space located between the inside wall of the housing of insulating material and the varistor stack is filled with a liquid and/or granular filling material. As a result of this feature, the housing of insulating material will selectively fall apart in the case of a disturbance and a possible exploding of the housing of insulating material is avoided in this manner.

OBJECTS AND SUMMARY OF THE INVENTION

An object of the present invention is to provide an overvoltage arrester having a housing which is flashover occurs between both power connections.

In the overvoltage arrester according to the invention, the housing of insulating material is effectively protected from damage in the case of a disturbance and a rapid removal to the outside of the heat produced in the varistors is guaranteed even with the occurrence of large quiescent currents in the varistor stack. More particularly, an overvoltage arrester according to the present invention includes a housing in which a body of insulating material surrounds generally cylindrical varistor members and partially embeds the varistors on its surface while leaving a continuous pressure relief duct extending between the ends of the housing, and electrically-insulating, heat-conducting material is mounted within the housing to surround the body of insulating material.

BRIEF DESCRIPTION OF THE DRAWINGS

In the text which follows, an illustrative embodiment of the invention is explained in greater detail with the aid of an illustrative embodiment shown in the drawing, in which.

DETAILED DESCRIPTION OF THE PREFERRED EMBODIMENT

Figure 1:
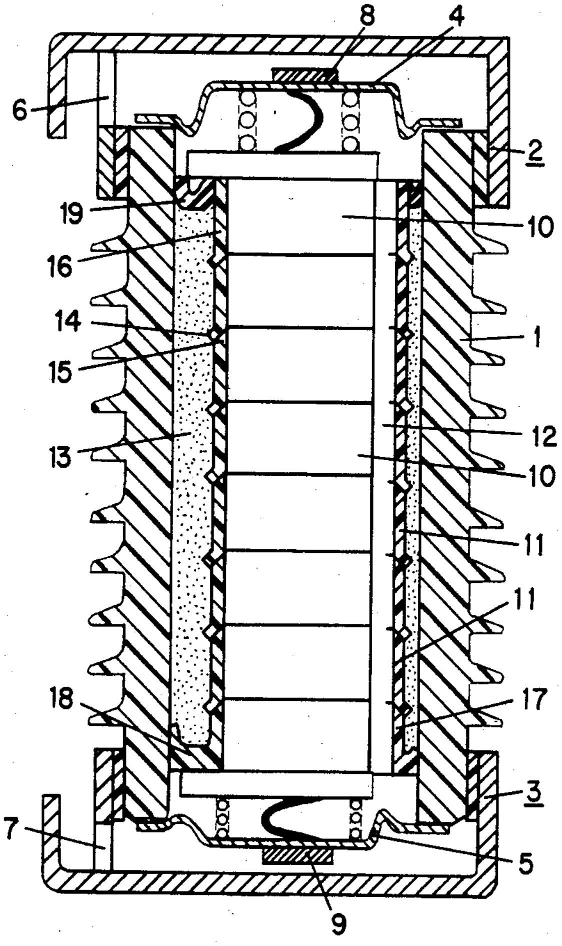
FIG. 1 shows a top view of an overvoltage arrester in axial section in accordance with the invention.

The overvoltage arrester shown in FIG. 1 has a cylindrical housing 1 of insulating material, consisting of porcelain or plastic, which is filled with an insulating gas such as, for example, sulphur hexafluoride, of a pressure of for example 1 bar, and the upper and lower ends of which are hermetically sealed by a metal cap 2 and 3, respectively. The metal caps 2 and 3 each contain overpressure valves 4 and 5, gas venting ducts 6 and 7 and power connections 8 and 9. The power connections 8 and 9 are electrically conductively connected to the upper and lower end, respectively, of a stack, arranged coaxially with respect to the housing 1 of insulating material, of cylindrical varistors 10 essentially consisting of zinc oxide. Each of the varistors 10 has at both end faces electrodes, not drawn, which are, for example, constructed as a metallic coating and by means of which potential equalization is achieved between adjacent varistors 10 while simultaneously connecting all varistors of the stack in series.

The surface area of each of the varistors 10 is constructed as an electrically insulating protective layer the greatest proportion of which is embedded in a body 11 of insulating material of an electrically insulating and heat-conducting material such as, for example, silicone rubber with or without filler such as, for example, aluminum oxide powder.

A part of the surface areas of the varistors 10, together with the bodies 11 of insulating material, delimit a pressure relief duct 12 extending in the axial direction through the overvoltage arrester and closed off by the overpressure valves 4 and 5. Between the bodies 11 of insulating material and the inside wall of the housing 1 of insulating material, an annular space 13 is additionally located into which an electrically insulating filling material of predeterminable heat conduction is inserted. This filling material can contain, for example, pulverized aluminum, magnesium, or titanium oxide, quartz or silica gel, in each case alone or mixed together, and can be additionally impregnated with an insulating liquid such as, for example, insulating oil. By suitably selecting the composition of this filling material, its heat conductivity can be varied within wide limits, making it easily possible to remove even relatively large quantities of heat, generated by the varistors 10 during the operation of the overvoltage arrester, from the varistor stack via the bodies 11 of insulating material, the filling material and the housing 1 of insulating material to the outside. At the same time, the filling material located in the annular space 13 supports the pressure relief duct and, together with the bodies 11 of insulating material, forms a protective two-layer system which protects the housing 1 of insulating material against thermal and mechanical stresses. In the case of a fault, such stresses can be caused by an arc extending along the varistor stack in the event of an overvoltage occurring. An increase in pressure in the insulating gas, produced by this arc, is reliably discharged to the outside via the pressure relief duct 12, the overpressure valves 4, 5 and the gas venting ducts 6, 7.

For the purpose of forming a gas-tight pressure relief duct 12 and simultaneously preventing filling material from entering the interior of the pressure relief duct 12, each of the bodies 11 of insulating material has at least one sealing face which rests against a sealing face of an adjacent body of insulating material. Such sealing faces can be located, for example, at an annular sealing lip 14 extending around one of the varistors 10 or at an outside cone 15, working in conjunction with this sealing lip 14, of an adjacent body 11 of insulating material.

The bodies 16, 17 of insulating material, located at the upper and lower end of the stack, have either a collar 18 which is constructed as a flange and rests with its outside edge against the inside wall of the housing 1 of insulating material, or are surrounded by an annular seal 19 which fills the space between the housing 1 of insulating material and the body of insulating material. This results in sealing of the annular space 13.

Figure 2:
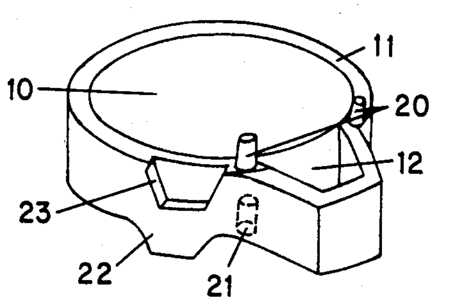
FIG. 2 shows, at an enlarged scale, a perspective view of a varistor, the surface area of which is partially embedded in a body of insulating material, of the overvoltage arrester according to FIG. 1.

The bodies of insulating material have adjusting devices for the purpose of precise in-line positioning of the pressure relief duct 12 during the assembly of the varistor stack. As can be seen from FIG. 2, such an adjusting device can have two pins 20 which are provided at one sealing face of a body 11 of insulating material, which pins work in conjunction with holes 21, shown in dashed lines, of the body 11 of insulating material adjacent in the stack, and/or also two bulges 22 which work in conjunction with recesses 23 of the body 11 of insulating material mounted adjacently in the stack.

While this invention has been described in accordance with a preferred embodiment of the invention, it is recognized that variations and changes may be made therein without departing from the invention as set forth in the claims.

What is claimed is:

1. In an overvoltage arrester including a housing formed of insulating material, two power connections mounted in the housing, at least one cylindrical varistor located in the housing and connected in series with the power connections by electrodes located at the end faces of the at least one varistor, a body of insulating material which at least partially embeds the at least one varistor on its surface, and an annular space located between the body of insulating material and an interior wall of the housing, the improvement comprising:

the at least one varistor located relative to the body of insulating material to define a pressure relief duct extending interior of the body of insulating material between the power connections, and an electrically-insulating, heat-conducting material means filling the annular space.

2. In an overvoltage arrester including at least two varistors which are coaxially arranged in a stack and at least two surrounding bodies of insulating material which have sealing faces, which rest on top of each other adjacent the varistors, the improvement comprising:

a first of the at least two bodies of insulating material having an annular sealing lip which extends around an associated varistor, and a second of the at least two bodies of insulating material having a sealing face which is constructed as an outside cone which mates with the sealing lip of the first body of insulating material.

3. An overvoltage arrester according to claim 2, wherein a body of insulating material located at an end of the stack has a collar which extends around the associated varistor and is supported in a sealing manner against an adjacent interior wall of the housing.

4. An overvoltage arrester according to claim 2 wherein, at the sealing faces of the adjacent bodies of insulating material, at least one pin-like guide element extends in the axial direction.

5. An overvoltage arresting device comprising:

(a) an insulating housing;

(b) first and second electrical power connector means mounted in communication with the interior of the housing at spaced-apart locations;

(c) generally cylindrical varistor means mounted in series between said first and second electrical power connector means within the housing such that a generally annular space is provided between the varistor means and an interior wall of the housing;

(d) a body of insulating material mounted within said generally annular space to surround and partially embed the varistor means while leaving a continuous space between the varistor means and an interior surface of the body of insulating material to define a pressure relief duct extending between said first and second electrical power connector means; and (e) a body of electrically-insulating, heat-conducting material mounted within said housing to surround the body of insulating material.

6. A device as defined in claim 5 wherein the generally cylindrical varistor means comprises a plurality of generally cylindrical varistor members arranged in a stack with each of said varistor members being in electrical contact with adjacent members.

7. A device as defined in claim 6 wherein the body of insulating material includes at least first and second superposed body members which surround the varistor members, a first of the body members having an annular sealing lip and a second of the body members having a sealing face which sealingly mates with sealing lip.

8. A device as defined in claim 5 further including collar means which encompasses at least one end of the generally cylindrical varistor means and which extends in sealing engagement to the interior wall of the insulating housing.

9. A device as defined in claim 7 wherein said first body member includes guide means having at least one protruding member formed to extend therefrom, and said second body member includes at least one recess formed therein to receive said protruding member for guiding assembly of the varistor members arranged in a stack.

10. A device as defined in claim 9 wherein said protruding member has a pin-like shape.

11. A device as defined in claim 9 wherein said protruding member has a bulge-like shape.

12. A device as defined in claim 5 further including over-pressure valve means to close the ends of said pressure-relief duct except under conditions of substantial gaseous pressure developed during overvoltage conditions.

13. A device as defined in claim 5 wherein the electrically-insulating heat-conducting material is selected from the group consisting of pulverized aluminum, magnesium, titanium oxide, quartz gel, or silica gel, and mixtures thereof.

14. A device as defined in claim 13 wherein the electrically-insulating heat-conducting material is impregnated with an insulating liquid.

* * * * *